Feb. 16, 1932.     C. J. BOCK     1,845,393
MOUNTING FOR POWER PLANTS
Filed Aug. 13, 1930
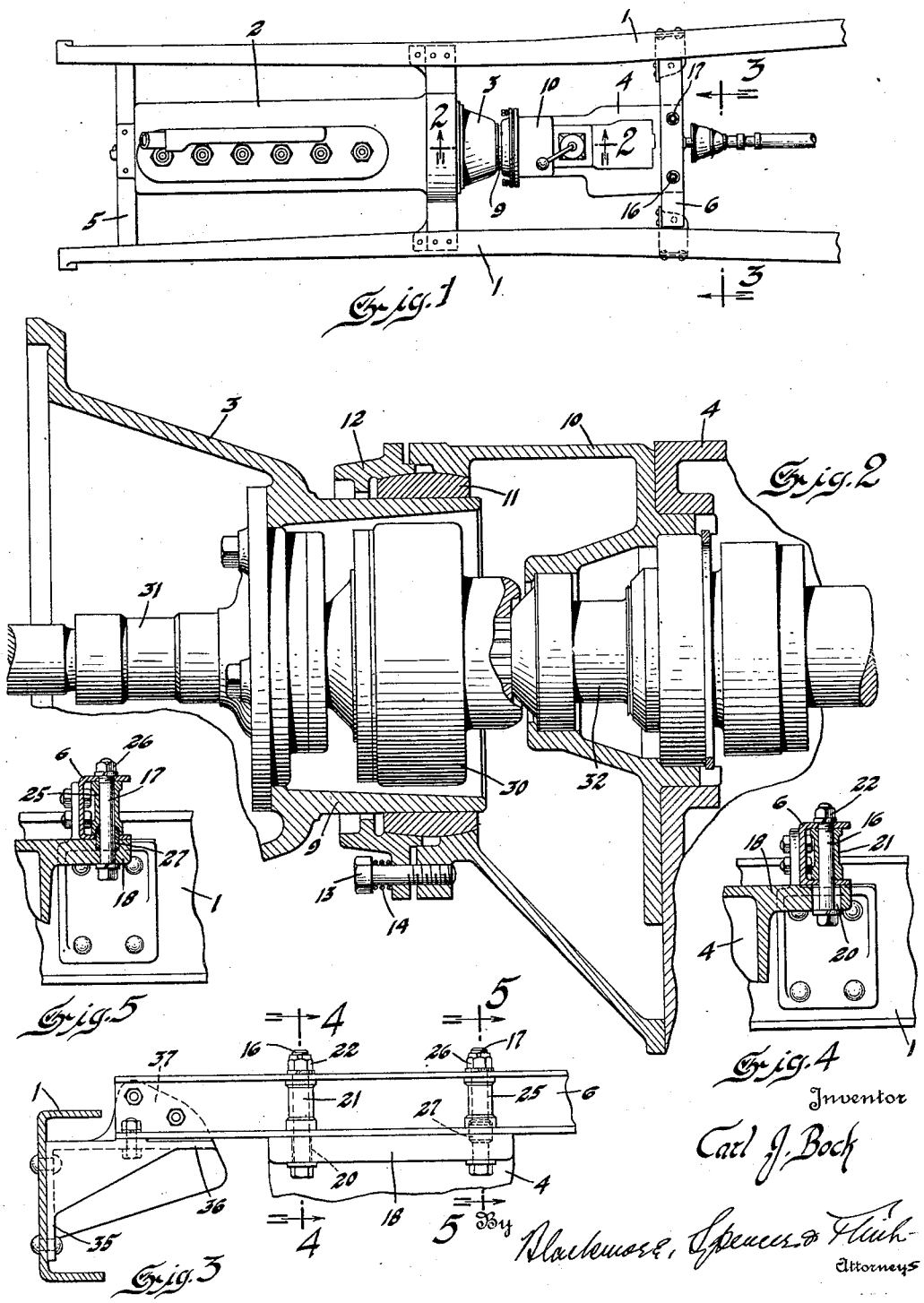

Patented Feb. 16, 1932

1,845,393

UNITED STATES PATENT OFFICE

CARL J. BOCK, OF PONTIAC, MICHIGAN, ASSIGNOR TO YELLOW TRUCK & COACH MANUFACTURING COMPANY, OF PONTIAC, MICHIGAN, A CORPORATION OF MAINE

MOUNTING FOR POWER PLANTS

Application filed August 13, 1930. Serial No. 475,072.

This invention relates to motor vehicles and the like and more particularly to an improvement in power plant mountings.

To provide a satisfactory mounting and one which is especially effective in reducing the imposition of strains on the power plant, incident to the twisting and weaving of the chassis frame members due to unevenness of the road bed and similar causes, it has been the customary practice, in motor car design, to support the power plant, which usually consists of an engine, a clutch and a change speed mechanism all connected and assembled together as a unitary structure, at three points on the chassis frame, the major portion of the load being carried at the sides intermediate the over-all length of the power plant and adjacent the flywheel housing at the rear of the engine with the third support at the front of the engine and centrally thereof. With this construction it has been found that the occurrence of frame weaving does not materially affect the position of the power plant nor cause damage thereto, and the three point support has come into wide and generally accepted usage.

While this conventional practice, as a general rule, meets the requirements in a majority of cases, it cannot safely be followed by all manufacturers and particularly those who have to deal with massive and heavy units as, for example, a transmission unit that involves five or more speed changes. Attempts have been made in the past to mount the bulky transmission housing independently of the engine but this takes up too much space and does not satisfactorily meet the situation as regards proper alinement and various other factors that must be taken into consideration. It is proposed, according to this invention, which has been especially designed for and will find particular utility in connection with large trucks, busses, tractors and other conveyances wherein the individual units of the power plant are quite large, to overcome the objections to the expedients heretofore followed and go a step further in the elimination of any bad effects on the power plant from the twisting and distortion of frame members, and to this end there is contemplated, among other things, the provision of a flexible joint connection between certain units of the power plant to allow relative movement therebetween and also the use of additional points of support all co-operatively arranged and constructed to afford the desired flexibility to the assembly as a whole.

The invention will be better understood upon reference to the accompanying drawings illustrating a preferred, but not necessarily the only embodiment of the invention, and wherein Figure 1 is a top plan view of the front portion of a chassis frame with a power plant mounted therein.

Figure 2 is a vertical sectional view of the joint construction between the units of the power plant assembly and is taken on line 2—2 of Figure 1.

Figure 3 is a fragmentary elevational view of the rear mounting for the transmission housing, looking in the direction of the arrows on line 3—3 of Figure 1.

Figures 4 and 5 are detailed sectional views taken on lines 4—4 and 5—5, respectively, of Figure 3.

Referring to the drawings, the reference numerals 1—1 indicate a pair of longitudinally extending channeled shaped members of the chassis frame which is to receive the power plant. In the present case the power plant includes an engine 2 which may be of the multiple cylinder internal combustion type having at its rear end suitable clutch mechanism enclosed within a bell housing 3, and change speed mechanism at the rear of the clutch enclosed within the housing 4. The engine unit is shown as being mounted at three points, its rear end being mounted at either side on the chassis frame members 1—1 and its front end being supported at a central point upon the front transverse frame member 5. It will be understood, however, that the particular type of mounting for the engine may be variously modified. The weight of the transmission housing unit 4 is carried partly on the frame member 6 and partly on the engine unit, the two units being connected together by a flexible joint to permit both a relative angular movement and a relative longitudinal sliding movement. This joint may be made by providing a cylindrical extension or projection 9 at the rear end of the bell housing 3 and a similar extension or projection 10 telescopically receiving the projection 9 and being either an integral part of the housing 4 or a separate part bolted thereto. A bearing ring 11 may be interposed between the extensions and provided, as shown in the drawings, with an interior cylindrical surface for sliding engagement with the peripheral surface of the cylindrical extension 9 and with the ball or parti-spherical peripheral surface received in a corresponding parti-spherical surface on the interior of the extension 10, and a corresponding surface on a retainer ring or collar 12 which may be secured to the extension 10 as by means of a series of fastening studs or bolts 13, each extending through an ear in the ring 12 into threaded engagement with an ear on the extension 10, with a helical coil spring 14 interposed between the head of the stud and the ring to maintain a tight fit and automatically take up wear between the parti-spherical surfaces. It will be seen, therefore, that the corresponding cylindrical surfaces permit a relative longitudinal sliding movement between the parts while the ball or parti-spherical surfaces accommodate relative angular movements.

The rear end of the transmission housing 4 is connected to the channeled section frame member 6 as by means of a pair of suspension bolts 16 and 17 which pass through a rearwardly extending ear or rib 18 which may be formed as an integral part of the housing. In the connection at 16, which is shown in detail in Figure 4, the suspension bolt extends through an elongated slot 20 in the ear 18 and upwardly through the flanges of the bar 6 carrying a spacer sleeve 21 between the flanges and is secured in place by the nut 22. The pin and slot connection thus afforded will permit a limited to and fro movement between the housing and frame member 6, such as may be necessary to accommodate any relative movement between the engine unit 2 and transmission unit 4. The other suspension bolt 17, which passes upwardly through the flange 18, the spacer sleeve 25 and frame member 6, carrying the attachment nut 26 on its upper end, is intended to afford a fixed pivotal axis about which the housing may turn and serves to definitely locate the housing in the frame. As shown in Figure 5, the bolt is preferably surrounded by a bushing 27 which extends into alined depressions or openings in the spacer sleeve 25 and flange 18 for the purpose of taking horizontal thrusts.

In line with the loose connection at the front of the housing 4 the transmission shafting is provided with a universal joint 30, of any conventional design, connecting the clutch shaft 31 and transmission shaft 32 to each other and having a sliding splined connection with at least one of said shafts, whereby the transmission of power from one shaft to the other will not be affected by the relative movement of the power plant units.

To facilitate assembly of the parts, a pair of supporting brackets 35 are riveted or otherwise secured to the frame members 1—1 and provided with horizontal shelf portions 36 on which the opposite ends of the frame member 6 may be supported. Each bracket also has a vertical ear 37 by means of which the bracket and frame member may be bolted or otherwise secured together. Preferaly, the shelf is of a width somewhat greater than that of the frame member so that upon assembly, after the engine 2 is first mounted on the frame, the housing 4 with the member 6 secured thereto may be dropped downwardly into position until the ends of the member 6 rest upon the shelves 36. The width of the shelf provides ample support and permits the bar to be shifted about while the joint parts are being brought together in proper relation for attachment with each other. In the event it becomes necessary to disassemble the parts after the vehicle has been in service, the transmission housing may be easily removed from underneath the vehicle without necessitating removal of the cab or body on the chassis frame which would be positioned directly above the transmission.

From the above description it will be seen that there is thus provided what is in effect a five point support for the power plant with the engine mounted at three points and the transmission unit also mounted at three points, two of the latter points of support being on the chassis frame and the third being a flexible joint between adjacent ends of the transmission and engine. This arrangement occupies a minimum of space and provides an efficient mounting for the units with sufficient flexibility to accommodate frame weaving without throwing strains into the power plant or affecting the transmission of power from one shaft to the other.

I claim:

1. A motor vehicle having a frame, an engine mounted in the frame, a housing for power transmission mechanism also mounted in the frame, and a coupling between the engine and housing accommodating both sliding and angular movements therebetween, drive shafts associated with the engine and housing respectively, and a loose connection between said shafts at the joint between the engine and housing.

2. A motor vehicle having a frame, an engine mounted in the frame, a transmission housing, a supporting connection between the housing and frame, a universal and sliding supporting connection between the housing and engine, power transmission elements associated with the housing and engine and a universal and sliding connection between said elements adjacent said connection between the housing and engine.

3. A motor vehicle having an engine unit and a transmission housing unit, a loose coupling between said units including an extension on one of the units, a bearing element slidable on said extension and provided with a parti-spherical surface, an extension on the other unit having a parti-spherical surface slidable on the corresponding surface of the bearing element, power transmission elements associated with the respective units and a universal and sliding connection between said power transmission elements adjacent said coupling.

4. A motor vehicle having an engine and a transmission housing, a loose coupling therebetween including projections on the engine and housing respectively, telescoped one on the other, one of said projections having a cylindrical surface and the other having a parti-spherical surface, and a bearing element interposed between said projections and provided with cylindrical and parti-spherical surfaces corresponding to and slidably fitting the surfaces of said projections.

5. A motor vehicle having a frame, an engine mounted in the frame, a transmission housing, and a three point support for said housing including a locating pivotal connection between the housing and frame, a pin and slot connection between the housing and frame, and a universal and sliding connection between the housing and engine.

6. A motor vehicle having a frame, an engine mounted in the frame, a transmission housing, means for mounting said housing partly on the frame and partly on the engine, including extensions on the housing and engine respectively, telescoped on one another, a bearing ring therebetween having a cylindrical surface and a parti-spherical surface slidable respectively on corresponding surfaces of said extensions, a fixed pivotal connection between the housing and frame, and a loose connection between the housing and frame.

7. In a motor vehicle, a frame, an engine supported in the frame, a transmission housing, a connection for supporting one end of the housing on the engine, a transverse member for supporting the opposite end of said housing, and a pair of brackets on the frame having horizontal supporting shelves of a width greater than said transverse member and on which the transverse member is slidably supported to facilitate the assembly of said connection.

In testimony whereof I affix my signature.

C. J. BOCK.